United States Patent [19]

Cousino

[11] 3,917,701

[45] Nov. 4, 1975

[54] REDUCTION OF CERTAIN 2,2'-DISUBSTITUTED AZOXYBENZENES AND AZOBENZENES TO CORRESPONDING HYDRAZOBENZENES

[75] Inventor: James L. Cousino, Montague, Mich.

[73] Assignee: Lakeway Chemicals, Inc., Muskegon, Mich.

[22] Filed: Dec. 13, 1972

[21] Appl. No.: 314,572

[52] U.S. Cl. ............... 260/569; 260/143; 260/176; 260/205; 260/580
[51] Int. Cl.² ................................... C07C 109/04
[58] Field of Search ........................... 260/569, 580

[56] References Cited
UNITED STATES PATENTS

| | | | |
|---|---|---|---|
| 2,010,067 | 8/1935 | Dreyfus | 260/569 |
| 2,600,000 | 6/1952 | Kamlet | 260/569 |
| 2,744,935 | 5/1956 | Basel | 260/569 |
| 3,156,724 | 11/1964 | Werner et al. | 260/569 |
| 3,354,212 | 11/1967 | Donaruma | 260/580 X |
| 3,386,991 | 6/1968 | Gerber | 260/580 X |

Primary Examiner—R. V. Hines
Attorney, Agent, or Firm—Gordon W. Hueschen, Esq.

[57] ABSTRACT

Certain 2,2'-disubstituted hydrazobenzenes, including 2,2'-dichlorohydrazobenzene, 2,2'-dimethylhydrazobenzene, and 2,2'-dimethoxyhydrazobenzene are produced from the corresponding 2,2'-azoxy or azobenzene by a variation of the classical Bechamp reaction for the preparation of anilines, using iron filings and dilute acid. The reaction is accelerated by the employment of small amounts of lead as a reaction promoter and by employment of a solvent and preferably also a cosolvent. When applied to the preferred 2,2'-dichloro starting materials, the reaction is especially valuable in that it produces exceptionally high yields and purity of desired product with a minimum of amine and other byproducts.

29 Claims, No Drawings

REDUCTION OF CERTAIN 2,2'-DISUBSTITUTED AZOXYBENZENES AND AZOBENZENES TO CORRESPONDING HYDRAZOBENZENES

BACKGROUND OF INVENTION

1. Field of Invention

Certain 2,2'-disubstituted hydrazobenzenes — production thereof by reduction of corresponding azoxy of azobenzenes.

2. Prior Art

According to the prior art, anilines, by which term are included substituted anilines, are produced by the reaction of nitrobenzene or the corresponding substituted nitrobenzene using ion filings and acid according to the classical Bechamp 10 reaction. In theory, this reaction proceeds according to the following sequence: nitrobenzene-nitrosobenzene-phenylhydroxylamine-azoxybenzene (by condensation)-azobenzene-hydrazobenzene-terminal fission into two (2) molecules of aniline. The prior art is replete with references to this reaction and type of reaction, Lubs, The Chemistry of Synthetic Dyes and Pigments, ACS Monograph 127, Reinhold and Co. (1955), pp. 49 and 50, and Fieser and Fieser, Organic Chemistry, 3d edition, (1956), p. 584, being but two examples. Anoxybenzenes are also known to be converted into corresponding anilines using a metal, tin (Sn), plus hydrochloric acid. Roberts, Stewart and Caserio, Organic Chemistry, pp. 868–870, W. W. Benjamin, N.Y., N.Y. (1971). Moreover, quoting from J. March, Advanced Organic Chemistry: Reactions, Mechanisms and Structure, McGraw-Hill (1968) at pages 897, 898 and 902:

p. 897–898: "Both aliphatic and aromatic nitro compounds may be reduced to amines, though the reaction has been applied much more often to aromatic nitro compounds owing to their greater availability. Many reducing agents have been used, among them Zn, Sn, or Fe (or sometimes other metals) and acid; catalytic hydrogenation; sulfides such as NaHS or $(NH_4)_2S$; $AlH_3$—$AlCl_3$; and hydrazine and a catalyst.... With some reducing agents, especially with aromatic nitro compounds, the reduction may be stopped at an intermediate stage, and hydroxylamines, hydrazobenzenes, azobenzenes and azoxybenzenes may be otained in this manner.... Reduction by mineral acids cannot be stopped, but always produces the amine."

p. 802: "Azo, azoxy, and hydrozo compounds may all be reduced to amines. Metals (notably zinc) and acids, and $Na_2S_2O_4$ are frequently used as reducing agents."

In addition, it is known, for example from Sogn U.S. Pat. No. 2,794,046, issued May 28, 1957, Example 2 thereof, that 2,2'-disubstituted azoxybenzenes can be converted with formalin, caustic, and certain naphthoquinones to the corresponding hydrazo compounds in approximately 49% yield with byproduction of 22% of the corresponding 2-substituted aniline. When no naphthoquinone is employed in this reaction, 94% of the starting azoxybenzene is recovered unreacted, and approximately 6% of the starting material is still converted to the corresponding 2-substituted aniline.

Because the 2,2'-disubstituted hydrazobenzenes are in considerable commercial demand as pigment or dye intermediates, their economic production in highest possible yield and purest possible form is of considerable importance. Although the Sogn process is of value, to date such hydrazobenzenes have been most satisfactorily produced commercially starting from the corresponding substituted nitrobenzene by the employment of zinc and caustic. Morrison and Boyd, Organic Chemistry, 2d ed., p. 784, Allyn and Bacon (1966). Even such a process leaves much to be desired, however, since the yield of desired disubstituted hydrazobenzene by such process is approximately 80 percent maximum, with the yield of byproduct amines including anilines amounting to 13 percent and disubstituted azobenzenes to approximately 7 percent. Moreover, removal of impurities, as by an acid wash, is usually necessary before the desired 2,2'-disubstituted hydrazobenzene can be subjected to a subsequent benzidine rearrangement step, which is ordinarily the next step employed to convert the disubstituted hydrazobenzene to the corresponding disubstituted benzidine, for example, the 3,3'-dichlorobenzidine, the 3,3'-dimethylbenzidine (tolidine) or 3,3'-dimethoxybenzidine (dianisidine), which after diazotization are reacted with a coupling agent such as an acetoacetarylide to produce the ultimate dye or pigment.

It is apparent that a more economic method for the production of 2,2'-disubstituted hydrazobenzenes whereby they can be produced in higher yields and quality would be highly desirable.

SUMMARY OF THE INVENTION

According to the invention, certain 2,2'-disubstituted hydrazobenzenes, namely 2,2'-dichlorohydrazobenzene, 2,2'-dimethylhydrazobenzene, and 2,2'-dimethoxyhydrazobenzene are produced from the corresponding 2,2'-disubstituted azoxybenzene or azobenzene by reaction of the stated starting material with finely-divided iron, e.g., iron filings or powdered iron, in the presence of dilute acid. The fact the the method of the present invention produces the desired 2,2'-disubstituted hydrazobenzenes is unpredictable in view of the classical Bechamp reaction which, starting with the nitro compounds, employs iron and acid for the production of anilines, and especially since application of the same reaction conditions to the unsubstituted azoxybenzene produces aniline as the primary reaction product in yields of up to ninety percent. The reaction rate of the method of the invention is greatly assisted by the employment of a minimal amount of lead as reaction accelerator, thereby providing further commercial advantage from the standpoint of time cycles, above that already realized from the use of iron.

OBJECTS OF THE INVENTION

It is an object of the present invention to provide a novel method for the production of certain 2,2'-disubstituted hydrazobenzenes. It is a further object to provide such a method whereby certain desired products are produced in unprecedented yields and purity. It is another object to provide such a method whereby the 2,2'-disubstituted hydrazobenzenes are produced from the corresponding 2,2'-disubstituted azoxybenzene or 2,2'-disubstituted azobenzene. A particular object is the provision of a method for the production of (a) 2,2'-dichlorohydrazobenzene from 2,2'-dichloroazoxybenzene or 2,2'-dichloroazobenzene, (b) 2,2'-dimethylhydrazobenzene from 2,2'-dimethylazoxybenzene or 2,2'-dimethylazobenzene, and (c) 2,2'-dimethoxyhydrazobenzene from 2,2'-dimethoxyazoxybenzene or 2,2'-dimethoxyazobenzene. A still further object is to provide such a method wherein a minor amount of lead is included as reaction-promoter for acceleration of the reaction. Additional objects will be obvious to one skilled in the art, and still other objects will become apparent hereinafter.

GENERAL DESCRIPTION OF THE INVENTION

The starting materials for use in the method of the invention are known compounds. Reference is made to Example 1 of U.S. Pat. No. 2,794,046 for a preparation of 2,2'-dichloroazoxybenzene. The corresponding 2,2'-dimethylazoxybenzene and 2,2'-dimethoxyazoxybenzene are also known and can be produced in substantially the same manner. The corresponding starting 2,2'-dichloro, dimethyl, and dimethoxy azobenzenes are also known, reference again being made to U.S. Pat. No. 2,794,046.

The iron employed according to the invention is finely-divided, illustratively commercially-available iron filings or powdered iron. The iron, in whatever form employed, presents a large surface area for purposes of facilitating the reduction. The amount of iron employed according to the invention may vary widely. In practice, it has been found that stoichiometric amounts are satisfactory. Lower amounts give corresponding decreases in yield whereas excesses do not appear to result in the production of increased amounts of undesired byproduct amines. Up to about 200% excesses have been employed successfully in the process. Excesses appear to accelerate the reaction.

As the acid employed according to the invention, both inorganic and organic acids may be employed, as shown by Example 11. The mineral acids such as sulfuric and hydrochloric are preferred, especially hydrochloric. Variations in the volume of the acid employed do not appear to significantly affect the results of the process. Any suitable amount and concentration of the acid may be employed within limits of economy. Experiments have shown that concentrations of acid between about 0.1% and considerably about 7.3% perform satisfactorily in the process, but efficiency of the reaction is not improved by operating at higher concentrations. Stoichiometric quantities of acids or less in any suitable volume and in any suitable concentration may be employed. In practice, 100 grams of 7.3% hydrochloric acid has been found to be the stoichiometric quantity when using the quantities of other reactants employed in Example 1, herein, but concentrations much less than 7.3% have been used effectively. Volumes approaching the minimum are of course advantageous from the standpoint of plant operation.

The reaction period is generally determined, for reasons of economy, by the completion of reaction as shown by absence of starting azo- or azoxybenzene in the reaction mixture. This has been found in practice to be determinable conveniently by the employment of gas or thin-layer chromatography. The reaction may accordingly be conducted, depending upon reaction temperature and other conditions and the exact procedure of the reaction, for a period of up to 24 hours, or as short as 8 hours. Higher reaction temperatures appear to accelerate the reaction but have the undesirable effect of increasing the production of amine byproducts, especially about about 75° C. The presence of a cosolvent and lead as a reaction accelerator have also been found to diminish considerably the time necessary for the completion of the reaction. Although for certain purposes it may be sufficient to allow the reaction to continue overnight, for reasons of practical economy it is of course desirable that the time required for completion of the reaction not be substantially in excess of 8 hours.

The reaction can be conducted at room temperature, although excessive reaction periods are usually required. Heating of the reaction mixture to between about 45° and 75° C. is therefore desirable, and optimal reaction temperatures appear to be about 55° to 65° C. The practical upper limit of reaction temperature is that at which an excessive amount of amine byproduct is produced. At 80° to 85° C., the amount of amine byproduct produced is generally excessive.

The reaction can be conducted in the absence of solvent, employing organic starting material and dilute acid, and adding solvent only at a larger stage to recover reaction product, but reaction periods according to such procedure are generally excessive. For this reason, it is convenient to carry out the reaction in the presence of an organic solvent for the starting azoxy or azobenzene. Suitable solvents include aromatic hydrocarbons such as benzene, toluene, xylene, and the like. Hydrocarbon solvents are preferred. The solvent is only limited by the necessity that it be non-reactive with the reactants and reaction products under the conditions of reaction and that it be a suitable solvent for the dissolution of the starting azoxy- or azobenzene and should also be water-immiscible.

Operating with such a preferably two-phase system, as would be expected, presents the problem of obtaining intimate admixture of the reactants. Such intimate admixture is conveniently and desirably effected by the employment of vigorous stirring throughout the course of the reaction, but may also be assisted by the employment of a cosolvent. Such a cosolvent acts as a mutual solvent for the two phases, thereby greatly increasing efficiency of the reaction. Lower alkanols such as methanol, propanol, and isopropanol, as well as numerous other water-miscible solvents, such as acetone, dioxane, tetrahydrofuran, or the like, may also be employed as cosolvent. It is only necessary that the cosolvent, when employed, increase the miscibility of the two phases of the aqueous-organic system, thereby to facilitate the reaction. For this purpose, as previously stated, a mutual solvent is preferred. Methanol is generally preferred as cosolvent, especially when an aromatic hydrocarbon such as benzene or toluene is used as the water-immiscible solvent for the starting azoxy- or azobenzene. The amount of the cosolvent and the water-immiscible organic solvent and the relative ratios of the two are generally unimportant, and any suitable modifications may be employed which are effective for accomplishing the desired result. Numerous will immediately be apparent to one skilled in the art. The more cosolvent, e.g., methanol, employed, the faster the reaction proceeds, up to a point which appears to be limited only by economy and practicality. Any combination of solvents employed should of course result in a better physical contact with the iron-aicd mixture with the starting compound to be reduced.

The employment of lead as a reaction accelerator or promoter is highly advantageous, especially from an economic standpoint. Although the reaction of the invention proceeds without lead, and gives high yields of desired reaction product, it proceeds to completion much more rapidly when lead is present as reaction accelerator or promoter. The form in which the lead is present is not critical, and it may be accordingly added into the reaction in the form of any suitable lead salt, such as lead acetate, lead nitrate, or lead chloride. Lead acetate is preferred. The lead can also be deposited on the iron powder in a separate step, and the lead-bearing iron then employed in the reaction after filtration. Whether the lead is coated on the iron, added as a salt, or introduced into the reaction mixture in any other suitable manner is relatively immaterial, the point being that the reaction is accelerated by conducting the same in the presence of lead. When the lead is added into the reaction mixture in the form of a lead salt which is soluble in the dilute acid of the reaction mixture, it appears that the lead precipitates out and is deposited upon the surface of the iron employed in the reaction, although such concept is not critical to the operativeness of the process or of the role which lead plays as an accelerator therein. The amount of lead employed beyond a certain point does not appear to increase the efficiency of the reaction further. Any amount, however small, may be employed together with the iron in the reduction and appears to accelerate the reaction. However, .1% of lead, based upon the weight of the iron, has been found satisfactory in practice. Although amounts far in excess of this can be employed, even up to 5 or 10% of the weight of the iron, no advantage has been apparent from employing such excesses and for practical purposes they are avoided.

DETAILED DESCRIPTION OF THE INVENTION

The following Examples are given by way of illustration only and are not to be construed as limiting:

EXAMPLE 1

Best Method Known — Reduction of 2,2'-Dichloroazoxybenzene 11 grams of iron powder were etched with 10 milliliters of 10% hydrochloric acid for 1 hour at 95° to 100° C., after which there was added 10 milliliters of water (total = 20 ml of 5% HCl), the mixture was cooled to 65° C., and there was added 2 grams of 5% lead acetate solution and a solution of 13.4 grams (0.05 mole) of 2,2'-dichloroazoxybenzene in 30 ml benzene and 35 ml methanol. The mixture was stirred vigorously at 58° – 60° C. until the solvent phase was light yellow in color and gas or thin-layer chromatography showed absence of azoxy and completion of reaction. When the reaction was complete (ca. 8 hours), there was added 75 ml of water and 50 ml benzene, the mixture was filtered at 60° C., the residue was washed with hot benzene, the two-phase filtrate was shaken with dilute acid to extract the ortho-chloroaniline byproduct, and the solvent phase was analyzed for the hydrazo compound by rearrangement with mineral acid (sulfuric) followed by titration with nitrite. Analysis showed the product to contain 94% 2,2'-dichlorohydrazobenzene and 3–4% ortho-chloroaniline.

EXAMPLE 2

Reduction of 2,2'-Dichloroazobenzene 5.5 grams of iron powder were stirred with 45 grams of 0.2% hydrochloric acid, to which was added 0.9 gram of 5% lead acetate solution, 6.7 grams of 2,2'-dichloroazobenzene dissolved in 18 grams of benzene and 16 grams of methanol. The mixture was stirred well until light in color, whereafter 25 ml of water was added and the mixture filtered to remove the iron residue. Analysis of the filtrate showed a yield of 93.2% 2,2'-dichlorohydrazobenzene and 4.65% ortho-chloroaniline.

EXAMPLE 3

Reduction of 2,2'-Dimethylazoxybenzene or Azobenzene

Otherwise using identical procedure, quantities, and time specified in EXAMPLE 1, 2,2'-dimethylazoxybenzene was reduced. The produce comprises 29% 2,2'-dimethylhydrazobenzene and 23.8% ortho-toluidine. Obviously the reaction was not complete.

Substantially the same result is obtained when 2,2'-dimethylazobenzene is employed as starting material.

EXAMPLE 4

Reduction of 2,2'-Dimethoxyazoxybenzene or Azobenzene

Otherwise using the identical procedure and quantities specified in EXAMPLE 1, the compound 2,2'-dimethoxyazoxybenzene was reduced to give a yield of 30% 2,2'-dimethoxyhydrazobenzene and 68% ortho-anisidine.

Substantially the same result is obtained when 2,2'-dimethoxyazobenzene is employed as starting material.

EXAMPLE 5

Reduction of 2,2'-Dichloroazoxybenzene without Lead Acetate

Otherwise using the identical procedure and quantities specified in EXAMPLE 1, but omitting the lead acetate, the reaction of this run proceeded more slowly and produced 67.2% 2,2'-dichlorohydrazobenzene and 3.9% ortho-chloroaniline after 12.5 hours at 60° C.

EXAMPLE 6

Reduction of Ortho-Nitrochlorobenzene—Comparative

Otherwise using the identical procedure and quantities specified in EXAMPLE 1, ortho-nitrochlorobenzene was reduced instead of the azoxy compound, giving all ortho-chloroaniline and no dichlorohydrazobenzene.

EXAMPLE 7(a) and 7(b)

Reductions Using Less Iron

Otherwise using the identical procedure and quantities specified in EXAMPLE 1, but using only 8.3 grams of iron powder, resulted in yield of 92% 2,2'-dichlorohydrazobenzene and 4.3% ortho-chloroaniline.

An identical experiment, but using only 6.0 grams of iron powder, produced a yield of 90% 2,2'-dichlorohydrazobenzene and 2.3% ortho-chloroaniline.

EXAMPLE 8

Effect of Acid Concentration on 2,2'-Dichloroazoxybenzene Reduction

Otherwise using the identical procedure and quantities specified in EXAMPLE 1, the effect of acid concentration at uniform volume was explored to produce the following results:

| % HCl by Weight | % ortho-chloroaniline | % hydrazo |
| --- | --- | --- |
| 50 ml of 0.1 | 7.0 | 90.0 |
| 50 ml of 0.5 | 5.2 | 91.0 |

-continued

| % HCl by Weight | % ortho-chloroaniline | % hydrazo |
|---|---|---|
| 50 ml of 2.0 | 3.4 | 94.0 |
| 50 ml of 7.3 | 6.5 | 89.0 |
| 50 ml of 0.0 (no acid) | 1.3 | 14.1 |

EXAMPLE 9

Effect of Caustic (Instead of Acid) — Comparative

Otherwise using the procedure and quantities specified in EXAMPLE 1, with the exception that 10 grams of 20% caustic soda (NaOH) was used instead of the hydrochloric acid, subsequent tests during the course of the experiment showed that the starting azoxybenzene was still present and no sign of either ortho-chloroaniline or 2,2'-dichlorohydrazobenzene. When conducted at 115° C. with 60% caustic soda, the maximum yield of 2,2'-dichlorohydrazobenzene attainable was about 70% with about 30% ortho-chloroaniline.

EXAMPLE 10

Use of Lead-Coated Iron 5.5 grams of iron powder was mixed with 50 grams of 0.2% hydrochloric acid and 0.9 gram of 5% lead acetate solution. The iron was removed by filtration, washed well with water, and then placed into a flask with 50 grams of 0.2 hydrochloric acid and a solution of 6.7 grams of 2,2'-dichloroazoxybenzene in 35 grams of benzene. The mixture was stirred until the benzene was light in color and gas or thin-layer chromatography showed the absence of azoxy. The reaction was then filtered to remove iron residues and the filtrate analyzed. Analysis showed the product to be 94% 2,2'-dichlorohydrazobenzene and 3.9% ortho-chloroaniline.

EXAMPLE 11

Effect of Acids — Variations

Otherwise using the identical procedure and quantities specified in EXAMPLE 1, experiments were run to determine the effect of the employment of different types of acid in the reaction. Below is a tabulation of the results showing that a variety of acids can be employed.

| Type of Acid | % Ortho-Chloroaniline | % 2,2'-Dichloro-hydrazobenzene |
|---|---|---|
| 0.1% sulfuric | 2.5 | 83.0 |
| 0.2% phosphoric | 2.0 | 49.2 |
| 0.2% acetic | 5.3 | 66.3 |
| 0.2% formic | 5.5 | 60.0 |

EXAMPLE 12

Effect of Metals other than Iron

Otherwise using the identical procedure and quantities specified in EXAMPLE 1, experiments were run to determine the effect of metals other than iron.

| Metal (Powdered) | % Ortho-chloroaniline | % 2,2'-Dichloro-hydrazobenzene |
|---|---|---|
| Nickel | 0.2 | trace |
| Magnesium | trace | trace |
| Tin | 1.9 | 7.5 |

-continued

| Metal (Powdered) | % Ortho-chloroaniline | % 2,2'-Dichloro-hydrazobenzene |
|---|---|---|
| Cobalt | 4.0 | 21.4 |

EXAMPLE 13

Effect of Other Lead Compounds

Using the identical procedure, quantities, and time specified in EXAMPLE 1, two experiments were carried out to determine the effect of different lead compounds on the reaction. The use of lead nitrate in the experiment produced 61.2% 2,2'-dichlorohydrazobenzene and 3.7% ortho-chloroaniline. The use of lead chloride produced 50.4% 2,2'-dichlorohydrazobenzene and 6.6% ortho-chloroaniline.

EXAMPLE 14

No Solvent at 60° C.

Using the procedure specified in EXAMPLE 1, but omitting the benzene and methanol, 2,2'-dichloroazoxybenzene was reduced. The results were 50.3% 2,2'-dichlorohydrazobenzene and 4.7% ortho-chloroaniline. The remaining 45% was unreacted dichloroazoxybenzene. Reaction time was 19.5 hours.

EXAMPLE 15

No Solvent at 102° C.

Using the procedure specified in EXAMPLE 1, but omitting the benzene and methanol and raising the reaction temperature to 102° C. (boiling), 2,2'-dichloroazoxybenzene was reduced. The results were 42.6% 2,2'-dichlorohydrazobenzene and 49.8% ortho-chloroaniline. Reaction time was 18 hours.

EXAMPLE 16

Effect and Quantity of Lead Acetate

Using the procedure specified in EXAMPLE 1, three experiments were run with various amounts of lead acetate. The results are listed in the Table below:

| % PbAc (% of iron used) | Reaction Time Required |
|---|---|
| 0 | 35 hours |
| 0.4% | 18 hours |
| 0.9%* | 8 hours |

*same as quantity used in EXAMPLE 1

This reaction was complete in each case as determined by gas chromatography.

EXAMPLE 17

Effect of Higher Temperature a. Using the procedure of EXAMPLE 1, but omitting the methanol, the reaction was run at 85° C., and produced 58.9% 2,2'-dichlorohydrazobenzene and 34.1% ortho-chloroaniline.

b. Another experiment conducted according to the procedure of EXAMPLE 1, but allowing solvent to evaporate until a temperature of 92° C. was attained, produced 15% 2,2'-dichlorohydrazobenzene and 84% ortho-chloroaniline.

It is to be understood that the invention is not to be limited to the exact details of operation or exact com-

I claim:

1. A method for the production of a 2,2'-disubstituted hydrazobenzene, selected from the group consisting of 2,2'-dichlorohydrazobenzene, 2,2'-dimethylhydrazobenzene, and 2,2'-dimethoxyhydrazobenzene, by the reduction of a compound selected from the group consisting of 2,2'-dichloroazoxybenzene, 2,2'-dichloroazobenzene, 2,2'-dimethylazoxybenzene, 2,2'-dimethylazobenzene, 2,2'-dimethoxyazoxybenzene, and 2,2'-dimethoxyazobenzene, comprising the step of effecting the reduction of the starting disubstituted azoxybenzene or disubstituted azobenzene with finely-divided iron and dilute acid.

2. A method of claim 1 wherein at least about the stoichiometric amount of iron is employed.

3. A method of claim 1 wherein reaction is conducted in the presence of lead as a reaction accelerator.

4. The method of claim 3 wherein the lead is added to the reaction mixture as a lead salt.

5. A method of claim 3 wherein the lead is deposited on the iron and the coated iron employed in the reaction.

6. A method of claim 1 wherein the starting material is 2,2'-dichloroazoxybenzene and the product is 2,2'-dichlorohydrazobenzene.

7. A method of claim 1 wherein the starting material is 2,2'-dichloroazobenzene and the product is 2,2'-dichlorohydrazobenzene.

8. A method of claim 1 wherein the reaction is conducted in the presence of a water-immiscible organic solvent for the starting azoxy or azobenzene, which solvent is non-reactive with the reactants and reaction products under the conditions of reaction.

9. A method of claim 8 wherein the solvent employed is an aromatic hydrocarbon solvent.

10. A method of claim 9 wherein the solvent employed is benzene, toluene, or xylene.

11. A method of claim 8 wherein the reaction is conducted in the presence of a cosolvent.

12. A method of claim 11 wherein the cosolvent is a lower-alkanol.

13. A method of claim 11 wherein the cosolvent is methanol.

14. A method of claim 1 wherein the reaction is conducted at a temperature between about 45° and about 75° C.

15. A method of claim 1 wherein the reaction is conducted at a temperature between about 55° and about 65° C.

16. A method of claim 1 wherein the acid is employed in an amount up to about the stoichiometric amount.

17. A method according to claim 1 wherein the acid is employed in an amount less than the stoichiometric amount.

18. A method of claim 1 wherein the acid employed is a mineral acid.

19. A method of claim 1 wherein the acid employed is hydrochloric acid.

20. A method of claim 18 wherein the acid is employed in a concentration up to about 7.3% by weight.

21. A method of claim 3 wherein the lead is employed in an amount up to about 5% by weight of the iron.

22. A method of claim 3 wherein the lead is employed in an amount up to about one percent by weight of the iron.

23. A method of claim 1 wherein the starting material is 2,2'-dichloroazoxybenzene, the acid is hydrochloric acid in a concentration of up to about 7.3% by weight and in an amount not substantially greater than the stoichiometric amount, and wherein the reaction is carried out at a temperature up to about 75° C. in the presence of a water-immiscible organic solvent.

24. A method of claim 23 wherein the water-immiscible organic solvent is an aromatic hydrocarbon.

25. A method of claim 23 wherein the reaction is conducted in the presence of lead in an amount up to about one percent by weight of the iron.

26. A method of claim 23 wherein a lower-alkanol cosolvent is also present.

27. A method of claim 25 wherein methanol is present as cosolvent.

28. A method of claim 23 wherein the reaction is conducted at a temperature between about 55° and about 65° C.

29. In a process for the iron-acid reduction of a reduced nitrobenzene in which the final reduction stage involves a fission of the produced hydrazobenzene into two molecules of the corresponding aniline, the improvement in which the starting compound is a 2,2'-disubstituted azoxy- or azobenzene selected from the group consisting of 2,2'-dichloroazoxybenzene, 2,2'-dichloroazobenzene, 2,2'-dimethylazoxybenzene, 2,2'-dimethylazobenzene, 2,2'-dimethoxyazoxybenzene, and 2,2'-dimethoxyazobenzene, said process being uniquely characterized in that the reduction does not go substantially beyond the hydrazobenzene stage, whereby the predominant product is a 2,2'-disubstituted hydrazobenzene selected from the group consisting of 2,2'-dichlorohydrazobenzene, 2,2'-dimethylhydroazobenzene, and 2,2'-dimethoxyhydrazobenzene.

* * * * *

UNITED STATES PATENT OFFICE
CERTIFICATE OF CORRECTION

Patent No. 3,917,701   Dated November 4, 1975

Inventor(s) James L. Cousino

It is certified that error appears in the above-identified patent and that said Letters Patent are hereby corrected as shown below:

[56] References Cited:
"2,744,935  5/1956  Basel" should read --2,744,935  5/1956  Johner--

Col. 1, line 15 "ion filings" should read -- iron filings --

Col. 1, line 26 "Anoxybenzenes" should read -- Azoxybenzenes --

Col. 1, line 46 "otained" should read -- obtained --

Signed and Sealed this

*twenty-third* Day of *March 1976*

[SEAL]

Attest:

RUTH C. MASON
*Attesting Officer*

C. MARSHALL DANN
*Commissioner of Patents and Trademarks*